United States Patent [19]
Case et al.

[11] 3,754,384
[45] Aug. 28, 1973

[54] MOWING, CONDITIONING AND WINDROWING MACHINE

[75] Inventors: Cecil L. Case, Newton; Robert L. Elder, Yukon; Ferol S. Fell, Newton, all of Kans.

[73] Assignee: Hesston Corporation, Hesston, Kans.

[22] Filed: July 26, 1972

[21] Appl. No.: 275,412

Related U.S. Application Data

[62] Division of Ser. No. 161,688, July 12, 1971, Pat. No. 3,716,972.

[52] U.S. Cl................... 56/14.4, 56/DIG. 1, 56/192
[51] Int. Cl.............................................. A01d 45/02
[58] Field of Search................. 56/1, DIG. 1, 12.7, 56/14.3, 14.9, 14.4, 14.5, 17.6, 11.3, 153, 167, 181, 192, 219–227, 156

[56] References Cited
UNITED STATES PATENTS

| | | | |
|---|---|---|---|
| 2,333,153 | 11/1943 | Crow | 56/1 |
| 2,515,343 | 7/1950 | Gravely | 56/17.6 |
| 2,878,635 | 3/1959 | Damkroger | 56/192 |
| 2,919,533 | 1/1960 | Hemmann | 56/220 |
| 3,014,326 | 12/1961 | Murray | 56/1 |
| 3,092,946 | 6/1963 | Mathews | 56/14.9 |
| 3,208,206 | 9/1965 | Lundell | 56/153 |
| 3,241,300 | 3/1966 | Fell et al. | 56/153 |
| 3,487,612 | 1/1970 | Keller et al. | 56/11.3 |
| 3,676,988 | 7/1972 | Hauser-Lienhard | 56/1 |

FOREIGN PATENTS OR APPLICATIONS

| | | | |
|---|---|---|---|
| 995,460 | 6/1965 | Great Britain | 56/156 |

*Primary Examiner*—Russell R. Kinsey
*Attorney*—Schmidt, Johnson, Hovey & Williams

[57] ABSTRACT

In the drying of hay, the stems only of the crop are conditioned, during cutting and before the cut crop is returned to the ground, by a flailing action which produces multiple transverse fractures along all of the stems as they are continuously blown and forcibly projected butt first in a wide, uniform, thin stream into a windrowing assembly. A single rotor with stem-fracturing hammers or blades not only conditions the stems while they are in movement, with sufficient severity to assure complete moisture release in accordance with stem coarseness and density of growth, all without undue loss of stem stiffness, leaf knock off or clipping, but also performs the function of creating air currents that provide the additional forces needed to properly propel the cut crop and produce a loose, fluffy, faster curing windrow.

10 Claims, 6 Drawing Figures

Patented Aug. 28, 1973
3,754,384
2 Sheets-Sheet 1
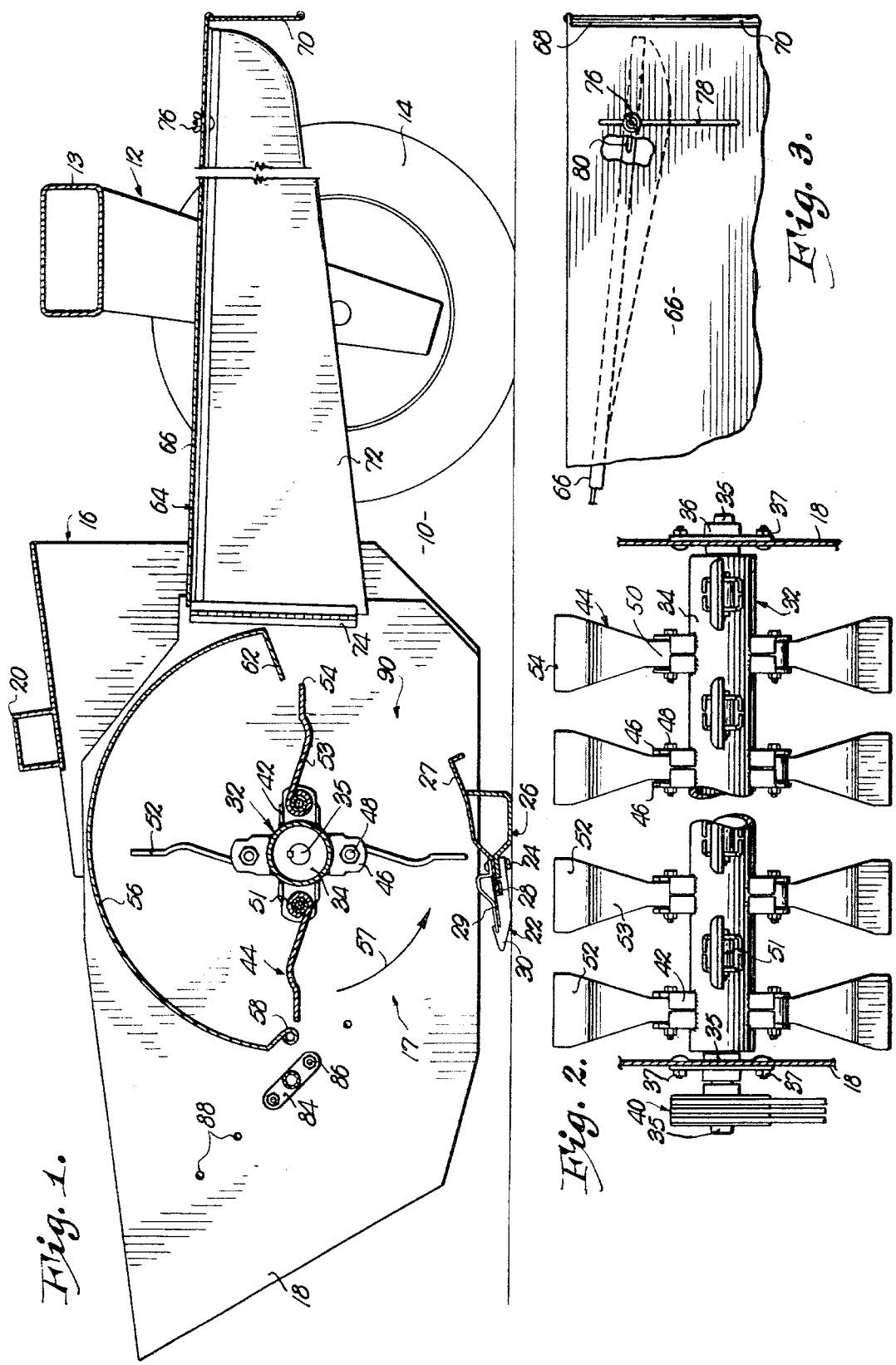

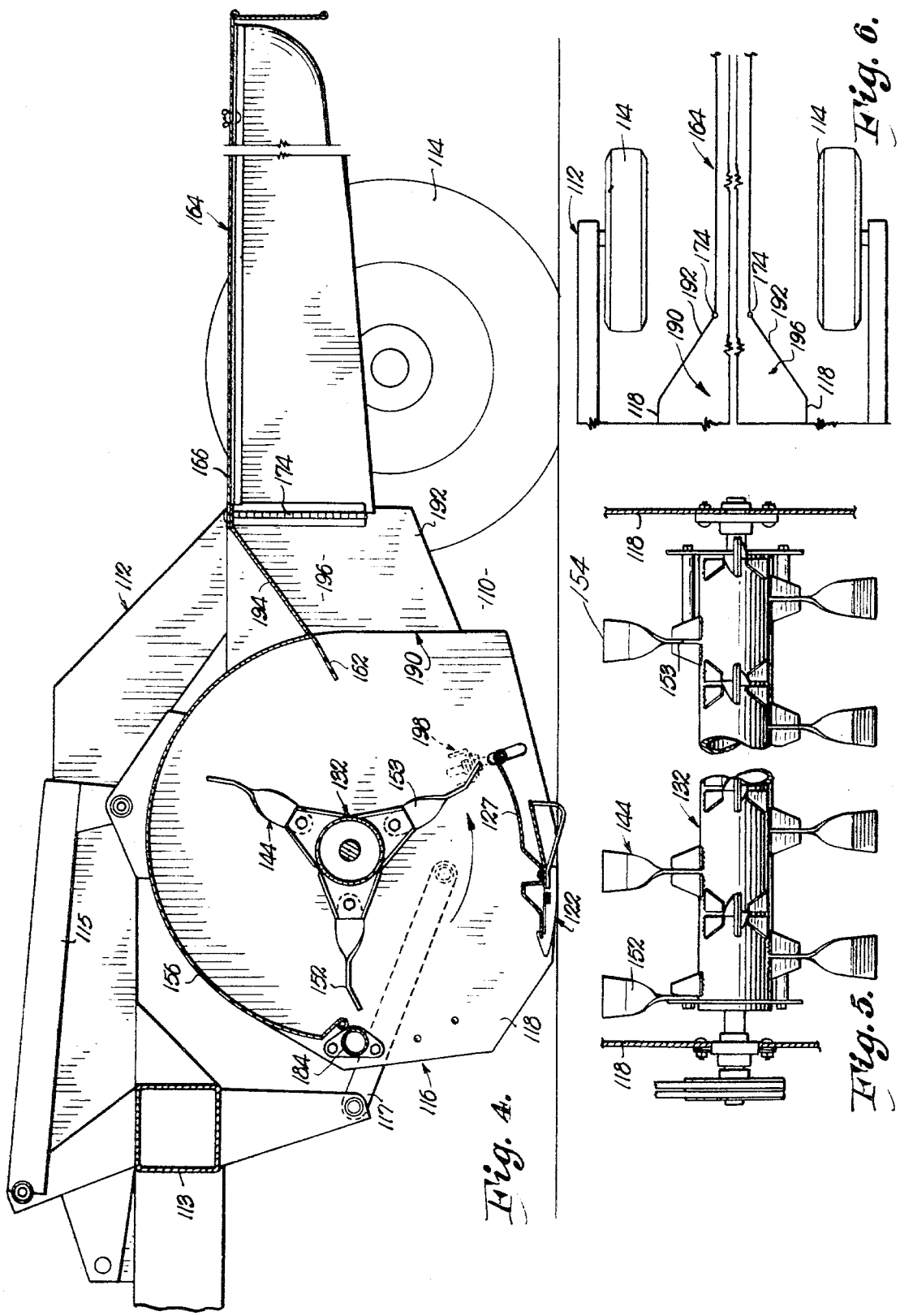

MOWING, CONDITIONING AND WINDROWING MACHINE

This application is a division of Ser. No. 161,688, now U.S. Pat. No. 3716972, filed July 12, 1971.

This invention relates essentially to the curing of hay, and more particularly to rapid drying of the crop in a windrow, it being well known that retention of carotine and nutrient value, as well as prevention of undue leaf loss, can be better accomplished by windrow drying than by any other practical drying method heretofore developed. Ideally the windrow is kept loose and fluffy because, manifestly, a dense, compact windrow texture is not conducive to quick moisture evaporation. It follows then that the way in which the windrow is formed, in conjunction with the characteristics of the crop being windrowed, determines to a large extent, the time required for disposing of the moisture prior to baling or other handling. Since the moisture to be removed is primarily that which is contained in the stems, proper conditioning consists in that type of stem fracture which will adequately release the fluids while, at the same time, not alter the nature of the stems to such extent as to preclude the formation of a windrow which has the necessary texture for proper drying. That is to say, stems which have been incorrectly conditioned such as to cause them to become limp, lifeless and no longer self-sustaining, will form into a dense, compact windrow, thereby defeating, to a large extent, the results intended by the conditioning in the first place.

At one time it was the commonly accepted practice to traverse a field three times using three separate pieces of equipment for each of the steps of mowing, conditioning and windrowing. In more recent years, a machine known variously as a windrower, swather or mower-conditioner has been popular in that it performs all three functions with one pass over the field.

An example of one type of such machine, which has proved to be highly successful commercially, is contemplated by U. S. Pat. No. 3,085,384, dated Apr. 16, 1963 in the names of R. A. Adee, et al., wherein is provided a crop squeezing unit for performing the aforementioned conditioning function. However, that machine requires the use of additional elements such as a reel and/or auger for the purpose of transferring the crop from the cutting zone to the separate conditioner spaced behind the transfer structure. U. S. Pat. Nos. 3,224,177 dated Dec. 21, 1965, in the name of Adee and 3,241,300 dated Mar. 22, 1966, in the names of Fell, et al., clearly disclose the disposition and manner of use of such double roll type of conditioner. When properly adjusted to fit crop conditions such machines perform commendably and are capable of effecting hay curing results which oftentimes closely approach substantial perfection. Yet, as will hereinafter appear, certain drawbacks have defied satisfactory correction and under adverse conditions rapid and proper drying in the windrow has not always been accomplished as ideally as might be desired.

The primary object of our present invention, therefore, is to improve upon known methods and equipment for curing hay.

The most important object of the instant invention is to form a windrow which, by virtue of its characteristics, and because of the condition of the hay which forms the same, causes production of an end product which was retained virtually all of the food value of the crop prior to cutting and without any substantial waste from a quantity standpoint, especially the leaves.

Another important object of our present invention is to provide a harvesting machine that performs the cutting, conditioning and redepositing functions with a minimum number of mechanisms and individual components.

It is another important object of the instant invention to utilize the kinetic energy imparted by rapidly moving hammers, as they project the cut crop rearwardly from the cutting mechanism, to repeatedly fracture the crop and thereby condition the same.

It is a further important object of our instant invention to provide apparatus that will condition a crop by repeated transverse fracturing of its stems without severance.

It is a further important object of our invention to provide a harvesting machine that will fully and completely condition a crop simultaneously with its transfer from the cutting area while suspended in space without the need for separate crop conditioning structure in the path of travel of the cut crop as it is being projected rearwardly.

It is yet a further object of the invention to provide a single assembly that simultaneously performs the functions of transferring the cut crop away from the cutting mechanism as it conditions the crop.

A very important aim of our present invention is to utilize air movement as one of the primary motivating forces for causing movement of the cut crop through the machine such that, other than impact fracturing, no unnecessary mechanical handling is employed, resulting not only in formation of a better windrow for drying purposes, but in reducing leaf separation and stem severance with consequent losses at the time of removing the windrow from the field.

Still another important aim of the instant invention is to provide an altogether new and vastly different type of stem fracturing system such as to attain decided improvements in the curing of cut crops preparatory to further handling and processing.

In the drawings:

FIG. 1 is a fragmentary, longitudinal, cross-sectional view of a mowing, conditioning and windrowing machine made in accordance with one form of our present invention capable of carrying out the method hereinafter set forth;

FIG. 2 is a fragmentary, detailed plan view of the rotor of FIG. 1, adapted for use also in the machine of FIG. 4 with its hammers extended radially from the axis of rotation as will be the case when the rotor is in operation;

FIG. 3 is a fragmentary, detailed top plan view of the crop directing and windrow formation deflectors shown in FIG. 1 with a portion thereof broken away for clarity;

FIG. 4 is a view similar to FIG. 1 showing a modified form of machine;

FIG. 5 is a view similar to FIG. 2 showing a modified form of rotor capable of use as illustrated in FIG. 4 or in FIG. 1 in lieu of the rotor shown in FIGS. 1 and 2; and FIG. 6 is a partially schematic, fragmentary top plan view of the deflecting structure shown in FIG. 4.

In the embodiment illustrated in FIGS. 1 – 3 a vehicle, broadly designated by the numeral 10, and adapted to be advanced over a field having a crop to be harvested, is provided with a frame 12 (including crossbeam 13) supported by a pair of ground-engaging wheels 14, one only of which is shown. Operably coupled with frame 12 is a header assembly 16 which extends substantially the full width of vehicle 10, the same as in the two patents last above mentioned.

Assembly 16, positioned transversely of the direction of travel of vehicle 10, has a crop inlet 17 extending entirely across the lower, substantially forward position of assembly 16 between parallel side members 18 (only one of which is shown). A cross brace 20 and framework 26 interconnect members 18, the latter of which also supports a crop-cutting mechanism 22 that is releasably attached thereto by fasteners 24. The upper portion of framework 26 is extended upwardly and rearwardly from the mechanism 22 to present an inclined crop-directing ramp 27. Mechanism 22 may include a reciprocable sickle bar 28 having knife sections 29 affixed thereto carried by a plurality of guard and hold-down assemblies 30 and driven by power means (not shown) for severing the crop as the vehicle 10 advances over the field. Members 18, mechanism 22 and forward edge 58 of a hood 56 co-operate to form the inlet 17 but, of course, any one of a number of various types of cutters other than a reciprocable sickle may be used.

Located above and of essentially equal length with the mechanism 22 there is disposed between members 18 a rotor 32 having a horizontal axis which is also transverse to the direction of travel of vehicle 10. Rotor 32 is composed of a hub 34 having stub shafts 35 rotatably supported by members 18 through use of bearings 36 having fasteners 37. A powered belt and pulley assembly 40 is provided to turn the rotor 32 in the direction of the arrow 57 in FIG. 1. Therefore, hammers 44 of rotor 32 move rearwardly as they pass over mechanism 22.

Rotor 32 has attached thereto a plurality of brackets 42 having ears 46 for swingably receiving a series of four rows of the individual hammers 44. The rows of hammers 44 are so arranged that there are two sets of diametrically opposed hammers 44. Alternate rows thereof are offset to each other so the hammers 44 follow in a path intermediate the hammers 44 of the preceding row. Releasable pivot bolts 48 support hammers 44 so that the swinging axes of the hammers 44 are parallel with the axis of rotation of rotor 32. Each hammer 44 is essentially of a trapezoidal configuration, having its narrowest end 50 formed into a loop 51 for swinging movement about pivot 48. Shank portion 53 of each hammer 44 is of a configuration to present a crop-engaging, rigid blade 52 as the outer extremity of hammer 44 is approached. This outer extremity of blade 52 presents an elongated, terminal edge 54 which likewise is substantially parallel to the above-mentioned axes of rotor 32 and hammers 44.

The widths of blades 52 are sufficient to overlap the intervening spaces between the blades 52 of the adjacent, preceding and offset row. This insures that contact is made with the crop along the entire longitudinal length of the rotor 32. Further, the trapezoidal configuration of the hammers 44 allows for the maximum area of contact with the crop at the point at which the crop is engaged by blades 52. The narrower shank portions 50 permit a wider gap between hammers 44 adjacent the hub 34 for the flow of air. This is important in that there is less resistance created by the air and therefore the power required for spinning the rotor 32 is minimized.

The shape of the hammers 44 and their arrangement along hub 34 is important also from the standpoint of both static and dynamic balance, and the reduction of vibration because the percussion point and center of gravity are spaced outwardly from the axis of rotation of stub shafts 35. This substantially reduces the tendency of the blades 92 to yield about their swinging axis in brackets 42 due to impact with the crop they engage.

A concavo-convex, elongated hood 56 also essentially the same length as cutting mechanism 22 and rotor 32, is affixed to and interposed between members 18 transverse to the path of travel of vehicle 10 and above rotor 32 so that its forwardmost rolled edge 58 and rearward flange structure 62 barely clear the edges 54 of hammers 44 when rotor 32 is in operation and hammers 44 are in their normally extended attitudes. Hood 56 restricts any crop or foreign objects that may have been carried past flange structure 62 by rotor 32 from flying forward due to centrifugal force and directs its reentry of the crop moving past the crop directing structure 27. Flange structure 62 of hood 56 provides crop directing means by limiting the upward path of the crop and to further direct its inclined path of travel as it is swept rearwardly by the rotor 32. The close proximity of flange 62 to the outer periphery of rotor 32 tends to strip away any portions of the crop that may have a tendency to be carried on around hub 34 by edges 54.

Crop deflecting structure, broadly designated by the numeral 64, is interposed between members 18 and extends rearwardly from assembly 16 for guiding and directing the propelled crop back to the ground. Structure 64 includes a flat, transversely horizontal, rectangular deflector 66 which serves to check the upward movement of the crop and orient it downwardly and rearwardly. Located at the rearwardmost edge 68 of deflector 66 is a downwardly-depending, swingable deflector 70 (which may be rendered adjustable, if desired) extending transversely to the path of travel of vehicle 10 for dropping the crop to the ground. A pair of laterally spaced panels 72 (only one of which is shown) depending from deflector 66 are swingably supported by upright hinges 74 on corresponding members 18. Panels 72 are attached to deflector 66 by means of quick-release fasteners 76 in cooperation with slots 78 and 80. Panels 72 are thus positioned to present a full width inlet opening therebetween essentially equal in width to the cut crop swath as it is projected rearwardly and upwardly by the rotor 32. Panels 72 present an essentially funnel-shaped outlet opening when they are adjusted toward and away from each other about hinges 74.

OPERATION

In operation, as the vehicle 10 is advanced from right to left, viewing FIG. 1, over a field for harvesting a standing crop thereon, the crop is first engaged by a lean bar 84 which interconnects members 18 for bending the crop forwardly. Bar 84 is adjustably held by fasteners 86 in cooperation with holes 88 in each of members 18. As the vehicle 10 continues to advance, and the crop passes through crop inlet 17, blades 52 and edges 54 of hammers 44 on rapidly spinning rotor 32 contact the cut crop, sweeping it toward the ramp 27. The peripheral speed of the rapidly spinning rotor 32 is many times greater than the forward speed of vehicle 10 so that as the cut crop is swept upwardly and rearwardly it is continuously and repeatedly flailed by the rapidly moving blades 52 and edges 54. The successive rows of hammers 44 continue to repeatedly inflict their flailing blows upon the severed crop to project it in an uninterrupted rearward flow.

As the rearwardly projected crop is swept past the mechanism 22 and the ramp 27 it is forced upwardly through outlet opening 90 defined by the inclined ramp 27, the flange 62 and the members 18. At this point the rotor has simultaneously performed the functions of conditioning the crop, sweeping it away from the mechanism 22 and projecting the cut crop into structure 64. The effect of the hammers 44 repeatedly striking the crop as the rotor 32 performs the above functions, and the frequency and force of such repeated impact upon the crop, is to cause the entire length of the stems of the crop to be fully and completely fractured and split, all as a result of the flailing blows imposed on the crop to move it in its rearward and upward trajectory. Any tendency for portions of the crop to continue to follow the path defined by the outer edges 54 of hammers 44 as they move rearwardly and upwardly is prevented by flange 62. As the crop continues its upward and rearward movement into the structure 64 it is contained and redirected by the deflectors 66 and 70 and panels 72 which, in combination, cause the crop to be redeposited on the ground in either a swath or a windrow, depending on the setting of panels 72.

A swath is formed when the pair of panels 72 are positioned so that they extend rearwardly in substantially parallel relationship thus permitting the crop to contact essentially the full widths of deflectors 66 and 70. A windrow is formed when the panels 72 are swung into a converging relationship, thus narrowing the area within which the crop travels as it contacts deflectors 66 and 70, thereby gathering and forcing the crop through a smaller opening as it is redirected toward the ground.

The conditioning hereinabove referred to is, of course, for the purpose of speeding up moisture removal and, therefore, the curing of the crop prior to removal from the field. Conditioning or fracturing by means of flailing blows is, mainfestly, to be distinguished from conditioning by the previous known method of crushing the stems between two mating rolls. When a crop is conditioned by crushing, it is possible to miss certain stems because all of the stems are not always oriented in the same direction as they move from the cutting mechanism and, therefore, do not always feed consistently and evenly into the rolls. This may result in bunching and clogging and very often these bunches are pushed on through the rolls which have become separated from each other to the point that the result is very little or in some cases no crushing of the same whatsoever. On the other hand, in the present invention, the continued, even flow of the crop, which is swept rearwardly butt first with the longitudinal axes of the stems substantially parallel to the direction of their rearward projection, results in a much more consistent, smooth and evenly cured swath or windrow not only in that the bunching is eliminated, but because the stems are kept oriented properly as the result of the action of hammers 44 thereon.

It is to be further noted that the conditioning process begins at the point that the hammers 44 first contact the cut crop, sweeping it away from the mechanism 22. The flailing and beating of the crop continues as the crop is suspended in its rearward trajectory and does not stop until it has cleared opening 90. As will also be understood from the foregoing, the series of blows inflicted upon each stem of the crop and the resultant fractures are spaced transversely along the entire length of each stem.

Rotor 32 effectively and very substantially simplifies the machinery needed to feed, cut, convey, condition and swath or windrow a crop. A single, relatively lightweight, simple assembly 32 does all the work of a plurality of assemblies in previously disclosed mower-conditioners. Rotor 32 replaces at the very minimum a crop feeding reel, two heavy and expensive-to-produce mating conditioner rolls that at best do not consistently and evenly condition, the necessary as well as complicated tensioning and linkage elements needed to make the conditioning rolls operable, and the attendant drive means for all components.

It is to be further noted that some harvesters utilize additional crop transferring assemblies such as an auger or drapers to assist in conveying the crop away from the cutting mechanism thereby further increasing the complexity and cost of such machinery. The simplicity hereinabove noted results in a substantially lesser power requirement to operate the harvester as well as fewer structural elements which presents a more economically priced harvester performing a complete and thorough crop conditioning function.

Most importantly, however, is the fact that the harvested crop emanating from the structure 32 is properly conditioned. Each and every stem is fractured a number of times thereacross throughout its length without severances, and no part of the plant, particularly the leaves, is damaged by the action imparted thereto by the rotor 32.

In the modified form of the machine as shown in FIGS. 4 - 6, crossbeam 113 on frame 112 of vehicle 100 is located forwardly of header assembly 116, and deflector assembly 164 is spaced from hood 156 but still disposed between wheels 114. Assembly 116 is supported by beam 113 through a pair of upper links 115 and a pair of lower links 117 exteriorly of hood 156 and its side members 188. The locations of rotor 132, lean bar 184, cutting mechanism 122, ramp 127 and flange 162 are essentially the same as in the machine illustrated in FIGS. 1 - 3.

Rotor 132 is provided with swingable hammers 144 which include cupped blades 152 and flat shanks 153 twisted relatively such that shanks 153 are radial to the axis of rotation of rotor 132 and blades 152 are transversely parallel to such axis. This type of hammer 144 is even more effective than the hammers 44 from the standpoint of air induction and, therefore, crop movement from mechanism 122 to assembly 164, and in the production of windrows having better drying characteristics.

Moreover, the hammers 144 to the left of the center of rotor 132 are twisted in one direction and the remaining hammers are twisted oppositely. This tends to cause the cut crop to move toward the longitudinal center line of the vehicle 110, starting the windrow formation even prior to discharge of the crop through outlet 190 of hood 156. Further gathering of the hay inwardly is effected by side panels 192 which are attached to members 118 and converge as hinges 174 are approached. An inclined top panel 194 constitutes a continuation of flange 162 and terminates at the front edge of deflector 166 of assembly 164. Panels 192 and 194 present an open bottom chute 196 for guiding the crop into the assembly 164.

In addition to the adjustability of bar 184 in accordance with the height of the standing crop, so as to cause the stems to move butt first from mechanism 122, arcuate, flexible, sheet metal ramp 127 is adjustable toward and away from rotor 132 in accordance with stem coarseness, crop density and other factors. Ramp 127 is fixed at its leading edge to mechanism 122 and may be raised and lowered by suitable adjusting components 198 at its trailing edge.

Depending on crop conditions and characteristics, the severity of conditioning of the stem is dependent to a large extent upon the distance between edges 154 of hammers 144 and the ramp 127. The extent of conditioning must be chosen so as to avoid undue leaf damage and knock off and to avoid clipping, chopping or severance of the stems. Also, the stems must not become limp because they then fail to form into a proper windrow. As long as they continue to be relatively stiff after conditioning, the stems do not tend to fall into a dense, tightly packed windrow.

Inasmuch as the air laden crop is blown and projected upwardly and rearwardly along the lower face of deflectors 66 and 166 it falls freely and loosely toward the ground, forming a fast drying windrow such that the purpose of proper conditioning made possible by the rotors 32 and 132 is not defeated.

Having thus described the invention, what is claimed as new and desired to be secured by Letters Patent is:

1. A harvester comprising:
   a vehicle adapted to be advanced over a field having a crop to be harvested;
   crop cutting mechanism carried by said vehicle; and
   a rotor mounted on the vehicle in superimposed relationship to said mechanism for rotation about a normally horizontal axis disposed transversely of the normal path of travel of the vehicle, and having its periphery in relatively close proximity to said mechanism,
   said rotor having a plurality of crop-engaging hammers mounted thereon and rotatable therewith for air and impact projection of the cut crop rearwardly from said mechanism and redeposit on the ground,
   said hammers being disposed to move rearwardly as they pass over said mechanism,
   each of said hammers having flailing structure for fracture conditioning of the crop while the hammers are in engagement with the crop.

2. A harvester as claimed in claim 1, said structure including a rigid blade on the hammer at the outermost free end thereof remote from said axis of rotation of the rotor.

3. A harvester as claimed in claim 2, each blade having an elongated terminal edge substantially parallel with said axis.

4. A harvester as claimed in claim 3, said rotor having a hub; and means attaching the hammers to the hub for swinging movement relative to the latter about axes parallel with said axes of rotation.

5. A harvester as claimed in claim 1; and means carried by the vehicle for confining the cut crop to an inclined path of travel extending upwardly and rearwardly from said mechanism.

6. A harvester as claimed in claim 5; and means within said path of travel of the cut crop for redirecting the latter downwardly and rearwardly to the ground.

7. A harvester as claimed in claim 6; and means within said path of travel of the cut crop for lateral gathering of the latter into the form of a windrow on the ground.

8. A harvester comprising:
   a vehicle adapted to be advanced over a field having a crop to be harvested;
   crop cutting mechanism carried by said vehicle; and
   a rotor mounted on the vehicle in superimposed relationship to said mechanism,
   said rotor having a plurality of crop-engaging hammers mounted thereon and rotatable therewith for projection of the cut crop from said mechanism through the air and ultimate redeposit on the ground,
   each of said hammers having flailing structure for fracture conditioning of the crop while the crop is in the air.

9. A harvester as claimed in claim 8; and means engageable with the crop prior to and during cutting for orienting the same so that it is projected with the severed, butt ends thereof leading.

10. A harvester as claimed in claim 8 wherein said hammers are adapted to produce currents of air for effecting said projection.

* * * * *